(No Model.)
A. C. SHUTTLEWORTH.
ELECTROMAGNETIC PIN EXTRACTOR ATTACHMENT FOR CLOTH FINISHING MACHINES.
No. 567,619. Patented Sept. 15, 1896.
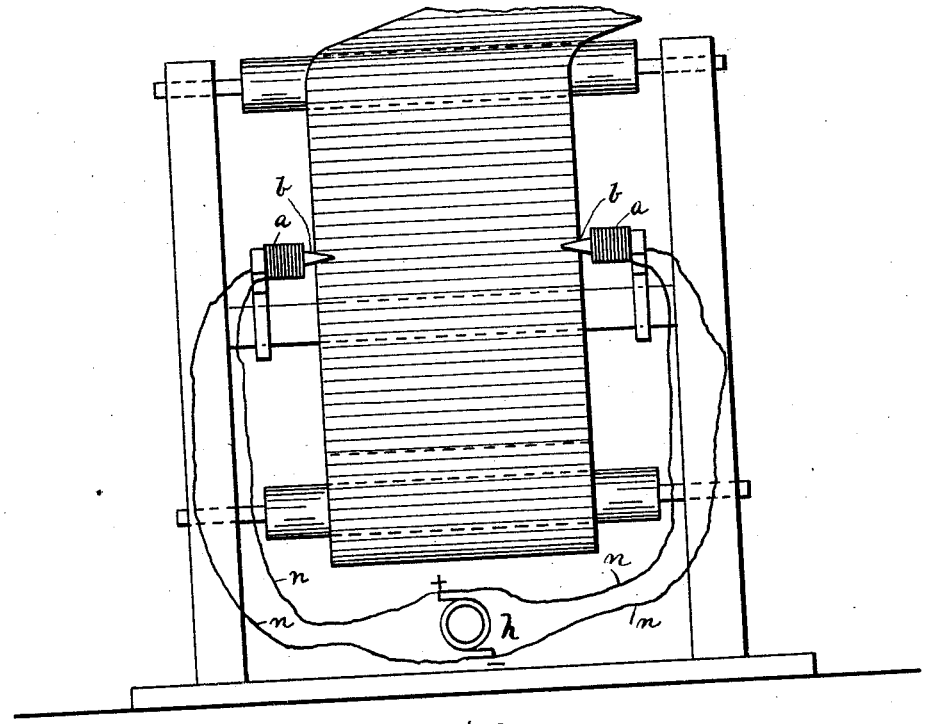
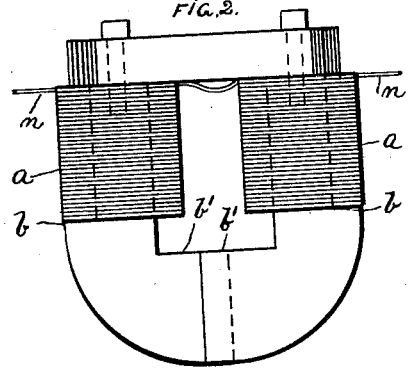
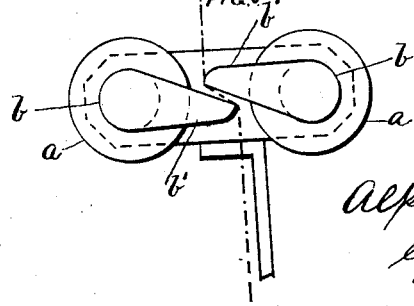
WITNESSES:
a Crosland
H. W. Shuttleworth
INVENTOR
Alpheus C. Shuttleworth
by Lewis F. Brous
atty

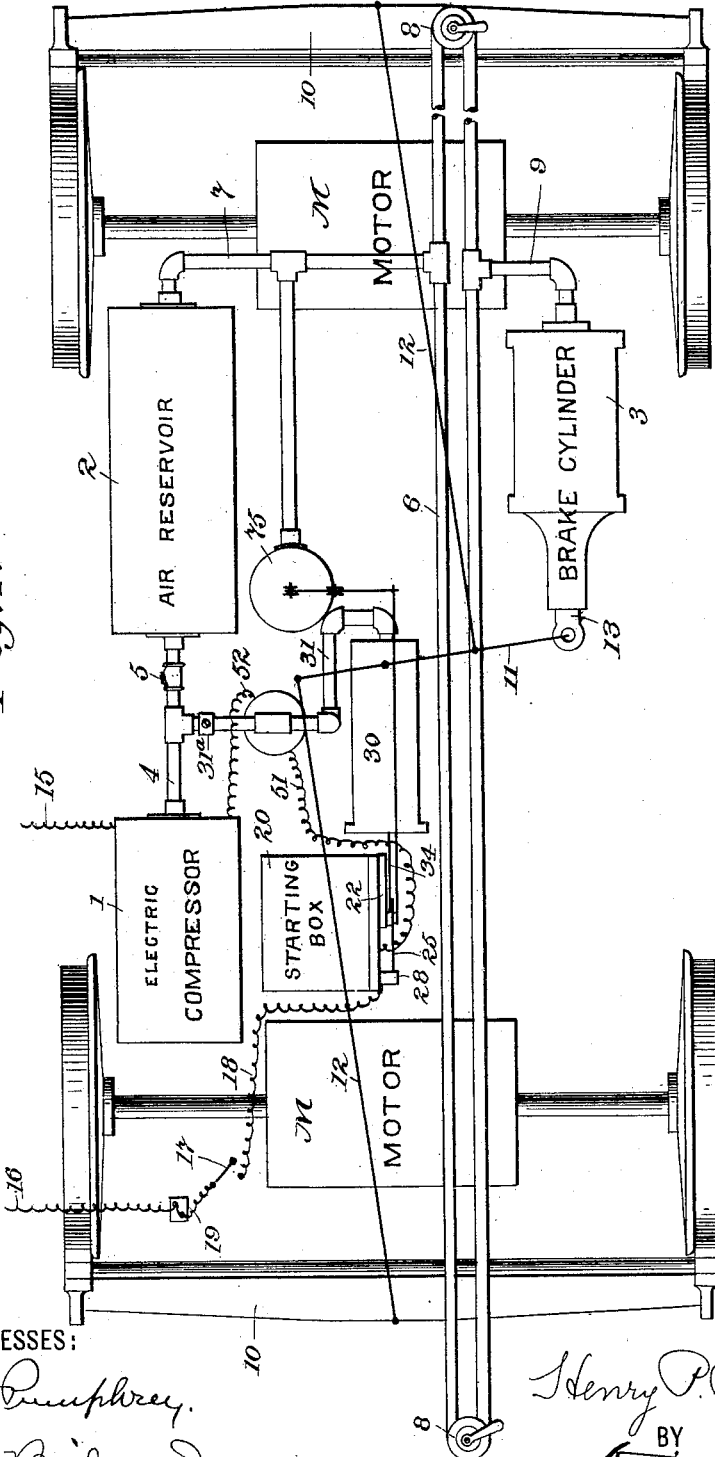

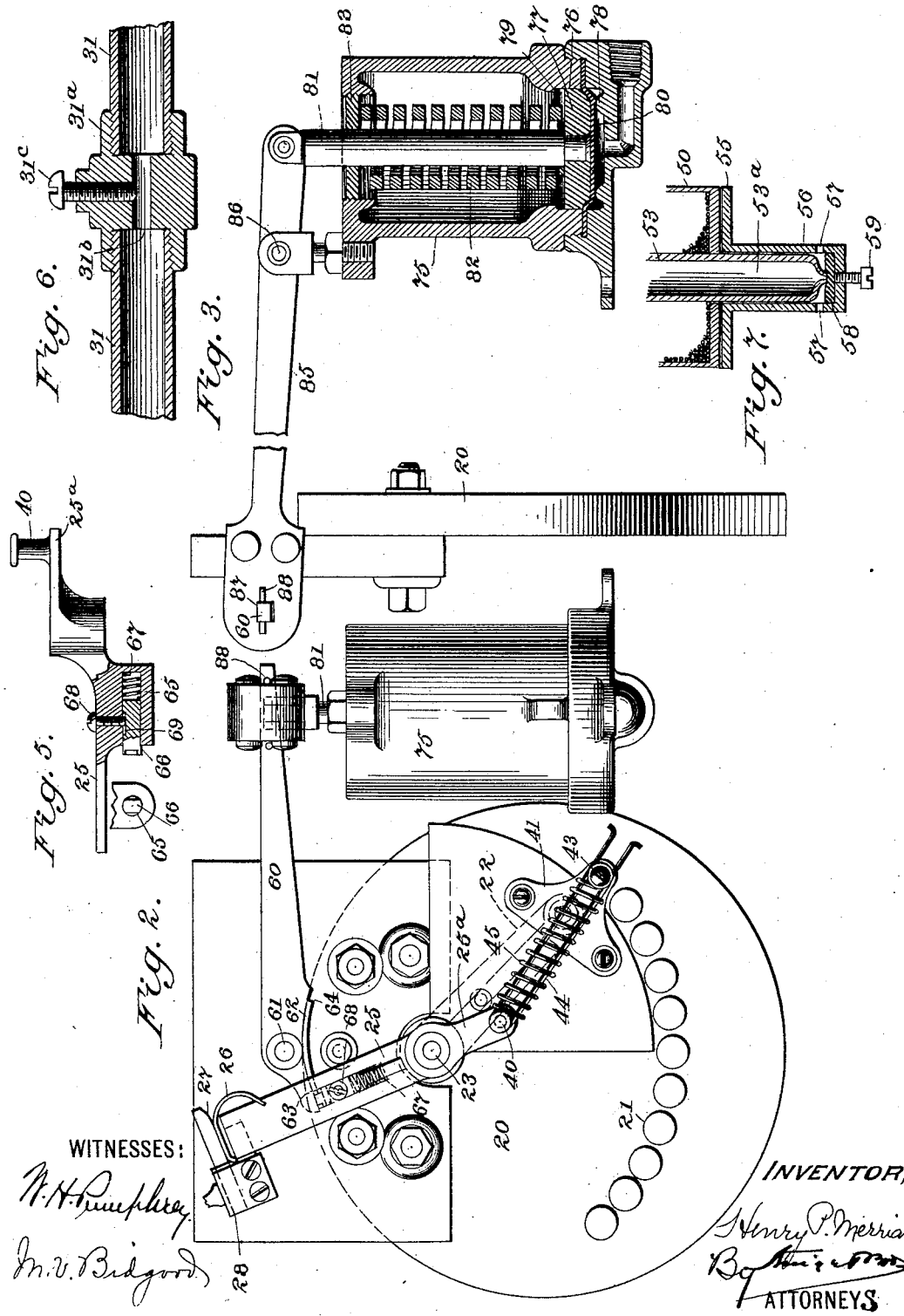

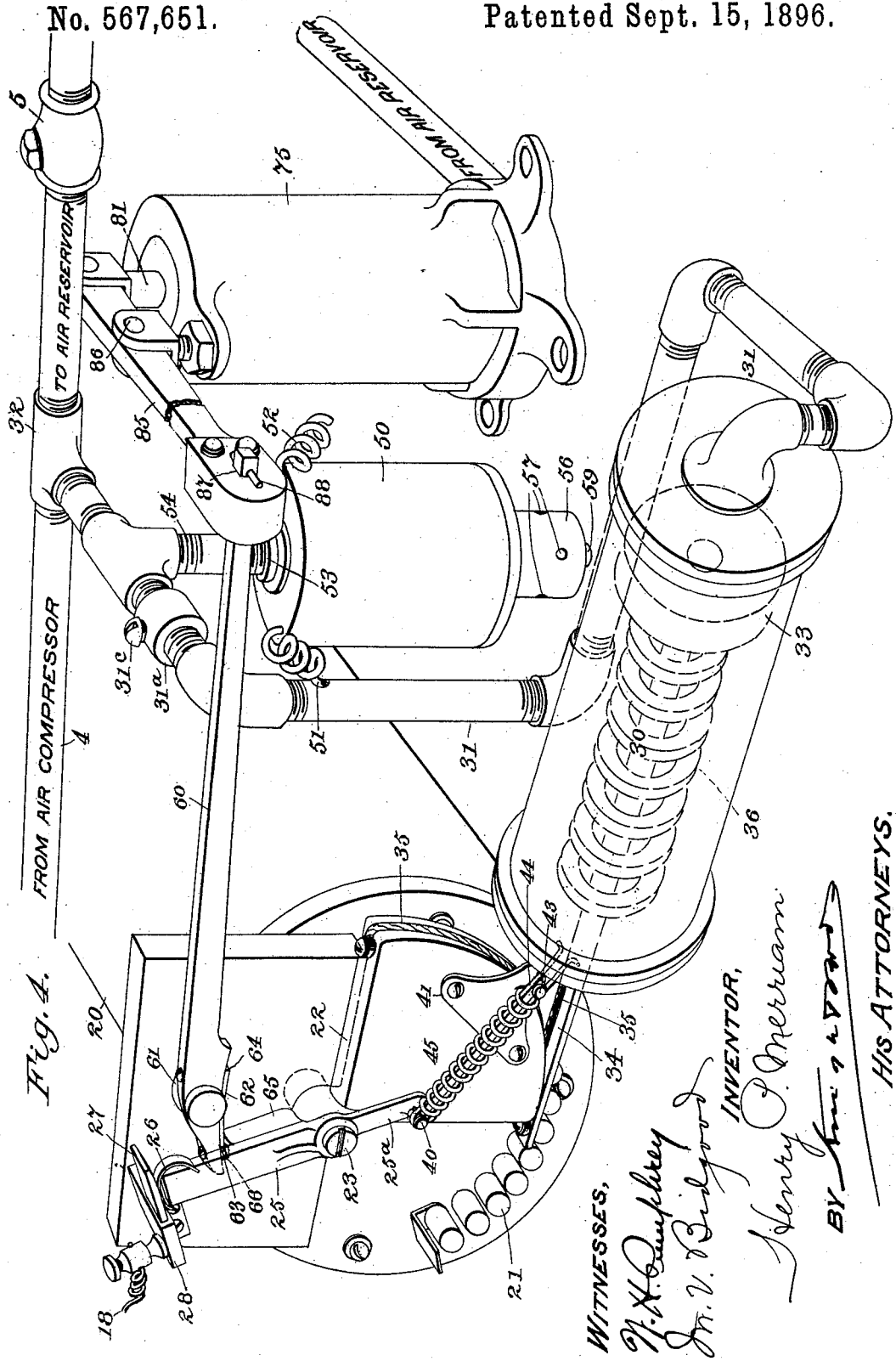

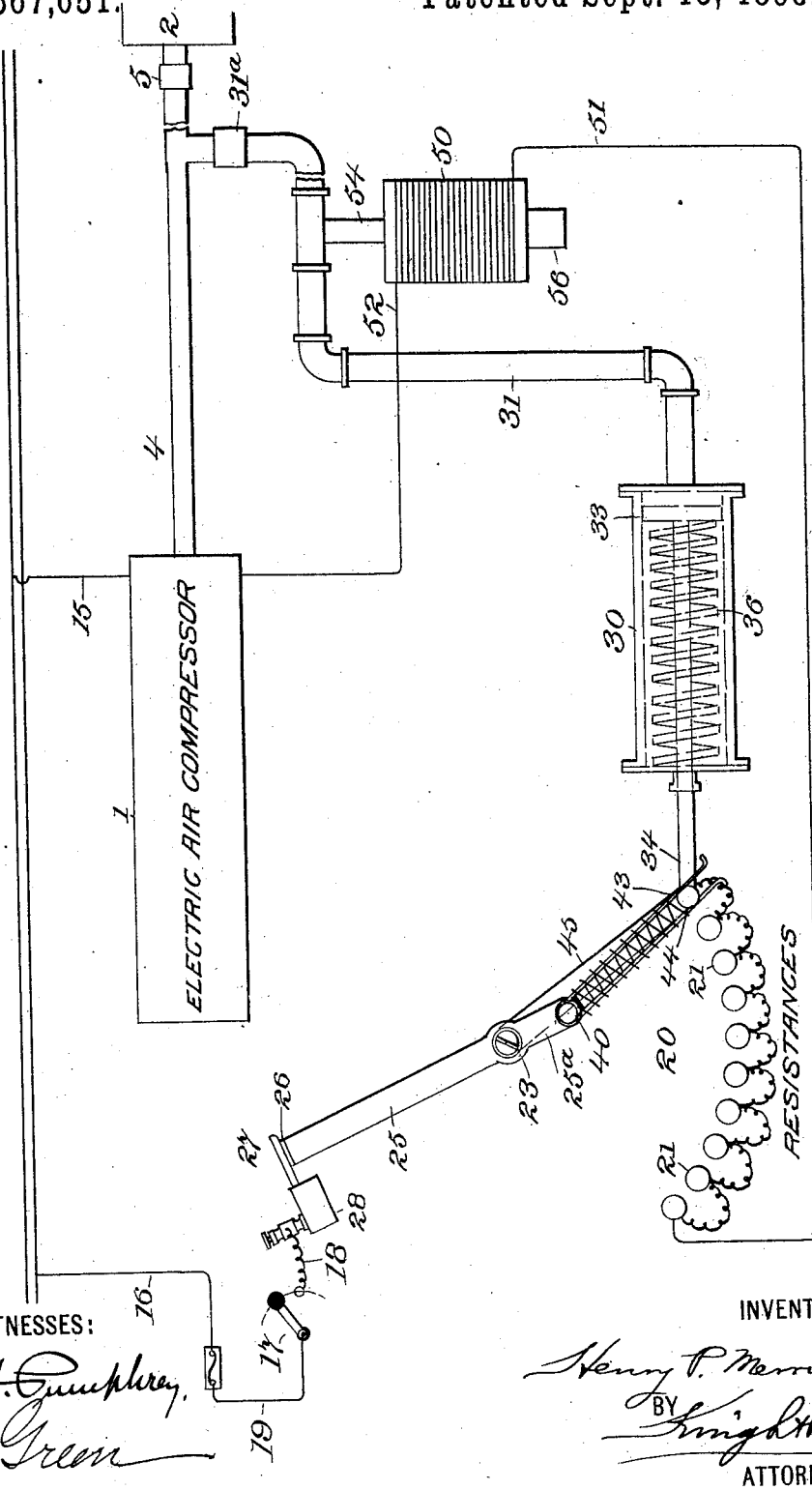

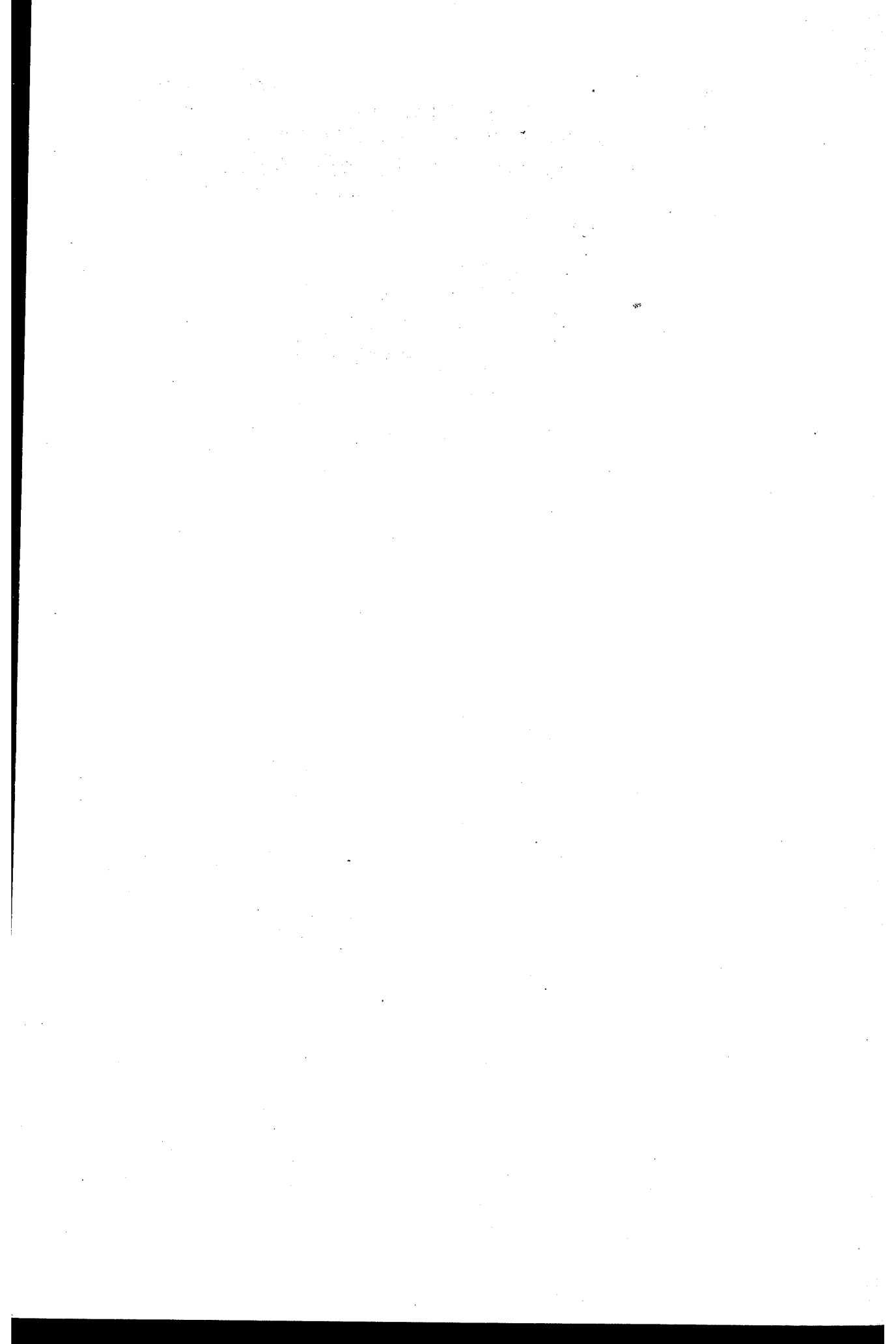

UNITED STATES PATENT OFFICE.

HENRY P. MERRIAM, OF NEW YORK, N. Y., ASSIGNOR TO THE STANDARD AIR BRAKE COMPANY, OF SAME PLACE.

AUTOMATIC REGULATOR FOR ELECTRIC MOTORS.

SPECIFICATION forming part of Letters Patent No. 567,651, dated September 15, 1896.

Application filed April 28, 1896. Serial No. 589,366. (No model.)

*To all whom it may concern:*

Be it known that I, HENRY P. MERRIAM, a citizen of the United States, residing at New York, in the county and State of New York, have invented certain new and useful Improvements in Automatic Regulators for Electric Motors, of which the following is a specification.

My invention relates to improvements in means for stopping and starting electric motors under control of or regulated by the pressure in or work being done by the apparatus driven by such motors.

It relates further to means for automatically connecting a resistance into the line when the motor is short-circuited or cut out of the circuit. I have had specifically in mind the application of the invention to regulating the electric motor employed for driving the air-compressor used for storing air for electric-car brakes; but I wish it to be understood that the invention is capable of a wide variety of applications, as above indicated, and in general to the cutting in and out of a motor in any location in accordance with the work being done in the apparatus. In the apparatus herein more specifically described electrically-driven air-compressors are regulated automatically by suitable devices controlled by the pressure of the compressed air, so that the current is gradually turned onto the motor after the circuit has been interrupted accidentally or otherwise, as by the slipping off of a trolley if the apparatus be on an electric car, or by the action of the automatic cut-out herein described, that is to say, I have a circuit making and breaking device controlled by the air-pressure and adapted to break the circuit when the pressure reaches the maximum point and make or complete the circuit when the pressure falls to the minimum point, and a resistance-box included in the electrically-driven air-compressor circuit and having a movable contact-arm which is controlled by the fluid-pressure for gradually cutting out the resistances and turning on the current to the compressor after the circuit has been made, and to immediately throw the resistances into the compressor-circuit after the circuit is broken.

In the herein-described embodiment of my invention I connect the movable contact arm or segment of the resistance-box with a piston working in an air-cylinder which communicates with the air-compressor and is provided with an electrically-controlled releasing-valve, both the resistance-box and releasing-valve being included in the same circuit with the electrically-driven compressor. The main circuit-closing arm is preferably operated by a suitable spring connection with the contact arm or segment of the resistance-box, it being moved into position to close the circuit and out of position to break the circuit by reason of said spring connection when it is released by the automatic controlling device under control of the compressed air. The controlling device comprises, preferably, a lever which is adapted to lock the circuit-closing arm in either position and a piston or diaphragm suitably connected to said controlling-lever and working in an air-cylinder communicating with the compressed-air reservoir.

In order that my invention may be fully understood, I will first describe the same with reference to the accompanying drawings, afterward pointing out the novelty with more particularity in the annexed claims.

In said drawings, Figure 1 is a view in diagram, illustrating my improved brake system as applied to a car. Fig. 2 is a view in front elevation of the automatic switch employed. Fig. 3 is a fragmentary view in sectional elevation thereof. Fig. 4 is a view in perspective, showing the automatic switch, together with its controlling and actuating mechanism, operatively assembled. Fig. 5 is a view in detail of the switch-bar, parts thereof being shown sectioned. Fig. 6 is a sectional view in detail of pressure-regulating device, and Fig. 7 is a similar view of the pressure-relieving valve. Fig. 8 is a diagrammatic view illustrating the electric circuit and means for automatically cutting out the resistances.

1 is an electrically-driven air-compressor. 2 is a compressed-air reservoir, and 3 is a brake-cylinder suitably mounted upon a car-truck which is represented provided with motors M upon the car-axles. The compressor 1 communicates with the reservoir 2 through the pipe 4, in which is located a check-valve 5 for preventing back pressure and retaining the pressure in the reservoir. The reservoir 2 communicates with train-pipe 6 through the branch pipe 7. The train-pipe 6 is provided with the engineer-valves 8, located at the opposite ends of the car. The brake-cylinder 3 communicates with the train-pipe 6 through branch pipe 9.

10 are the brake-beams connected with the centrally-located brake-lever 11 through connecting-rods 12, and 13 is the rod of the brake-piston pivoted to the end of the braking-lever 11. The action of the brake is the same as in an ordinary air-brake system.

15 is one of the circuit-wires leading to the air-compressor 1, and 16 is the other circuit-wire passing through the fuse device 19 and leading to the hand-controlled switch 17, from which the wire 18 passes to the resistance-box or starting-box 20, of any suitable construction, having a series of contact-plugs 21 in its face, with which the resistance-wires are connected.

22 is the contact lever or segment electrically connected with the common circuit-wire of the resistance-box and journaled upon an arbor 23, projecting from the resistance-box.

25 is the circuit-closing lever journaled upon the arbor 23 independently of the segment 22 and carrying at its upper end a contact 26, which is adapted to make contact with the contact 27, which is removably supported in the terminal socket 28, with which the wire 18 communicates. The construction of these contacts is preferably arranged in a well-known way to have the normal contact between metallic surfaces, but to have the spark taking place on rupture confined to a carbon block.

30 is an air-cylinder, from the end of which extends an air-pipe 31, communicating at 32 with the air-pipe 4 of the air-compressor. In the pipe 31 is placed a plug or diaphragm $31^a$, perforated at $31^b$. The aperture through this plug or diaphragm is regulated by a set-screw $31^c$, so as to regulate the transmission of pressure of air therethrough to the interior of cylinder 30. The plug or diaphragm $31^a$, having the screw-valve $31^c$, is preferably located between the compressor and electromagnetic releasing-valve, as shown in Fig. 1, but it may be located between the releasing-valve and cylinder 30, as shown in Fig. 4, without interfering with its proper operation.

33 is a piston mounted on the cylinder 30, and 34 is a rod extending from said piston and projecting through the head of the cylinder.

35 are wire cords or ropes attached, respectively, to the piston-rod 34 and contact-segment 22, passing over the grooved face of the contact-segment in such a manner that the movement of the piston 33 within the cylinder will positively move the contact-segment on its pivot.

36 is a cylindrical coil-spring surrounding the piston-rod 34 and confined within the cylinder 30, between the piston 33 and head of the cylinder.

The circuit-closing arm 25 has a heel or extension $25^a$, extending below the pivot 23, which heel is formed with a lug 40.

41 is a plate secured to the segment 22 and provided with a lug 43.

44 is a wire yoke extending from the lug 40 to the lug 43, embracing both of said lugs, and 45 is a spiral spring surrounding the yoke 44 and positively connected at its opposite ends with the lugs 40 and 43 for the purpose of affording a spring connection between the circuit-making arm 25 and the contact-arm 22 of the resistance-box.

50 is an electromagnet-coil in circuit with the resistance-box and electric compressor, the circuit-wire 51 uniting it with the resistance-box and the circuit-wire 52 uniting it with the electric motor of the compressor. The coil 50 surrounds the air cylinder or tube 53 of the releasing-valve, which tube 53 communicates through a short branch pipe 54 with the air-pipe 31, leading from the air-compressor to the air-cylinder 30. Surrounding the lower end $53^a$ of the releasing-valve is an armature 55, which supports a cylindrical extension 56, having radial air-outlet openings 57 and a leather or rubber washer 58, which is adjustably supported by the screw 59 and is adapted to close the outlet-opening of the extension $53^a$ when the armature 55 is attracted by the electromagnet.

60 is the main controlling-lever which regulates the making and breaking of the circuit of the regulating device. The lever 60 is pivoted upon a pin 61 at the end of the starting-box 20, and is formed with a rib 62, forming shoulders 63 and 64, with which engages a spring latch or bolt carried by the circuit-making arm 25. The arm 25 is formed with a rib or projection 65, having a cylindrical bore in which is slidingly mounted a cylindrical latch or bolt 66.

67 is a small spiral spring confined beneath the bolt 66, and 68 is a set-screw extending through the arm 25 and engaging a short longitudinal slot 69, formed in the pin or bolt 66 for limiting its movement. The bolt or pin 66 is formed with a squared head, which is adapted to engage the shoulders 63 and 64 of the ribs 62 of the controlling-lever.

75 is an air-cylinder communicating at bottom with the pipe 7, leading from the air-reservoir 2. The cylinder 75 has a contracted pocket 76 in its lower end, in which is mounted the piston 77, the piston having a vertical movement confined by the lower lugs 78 and the upper annular flange or rib 79.

80 is a flexible disk or diaphragm covering the lower surface of the piston 77 and confined between the cylinder and its lower head.

81 is a piston-rod extending upwardly through the cylinder from the piston 77, and 82 is a cylindrical coil-spring surrounding the piston-rod 81 and confined between the piston 77 and the cap 83. The cap 83 loosely surrounds the rod 81 and is threaded in the socket of the cylinder, rendering it adjustable for adjusting the strength of the spring 82.

85 is a lever pivoted at 86 and pivotally connected at one end to the upper end of the piston-rod 81 and formed at its opposite end with a socket 87, into which projects the small end of the controlling-lever 60, the lever 60 being confined in the socket 87 by a pin 88.

The operation of my improved regulator for air-compressors may be briefly described as follows: The particular application of the device shown in the accompanying drawings is for controlling the action of air-compressors for supplying compressed air to reservoirs of air-brake systems for street-railway cars. The drawings represent the device in operative position. Assuming that the car is running and that the compressor is being operated by a slight current fed to it through the resistance-box, (all of the resistances being normally in the circuit,) it will be clear that the air in the reservoir 2, pipe 31, and cylinder 30 will gradually be compressed. As the compression proceeds the piston 33 in cylinder 30 will be advanced by the pressure of the air against the action of the spring 36 and by reason of the connection between the piston-rod 34 and resistance-contact 22 the contact-segment 22 will be gradually advanced over the plugs of the resistance-box, effecting the gradual cutting out of the resistances from the circuit and the increase of the current flowing to the compressor as the load upon the motor increases. The action is regulated by means of the set-screw 31$^c$. Normally the motor will be started when the reservoir-pressure has fallen but little below the minimum. This pressure existing in the reservoir at starting is held off of the motor by the check-valve and the motor starts with the supply-pipes at atmospheric pressure. This of course is favorable to the starting of the motor. As the segment 22 advances it will be observed that the spring 45 will be stretched, tending to throw the circuit-closing lever 25 out of contact with the terminal 27. This action is, however, prevented by the engagement between the spring-latch 66 and shoulder of the controlling-lever 60. As soon, however, as the pressure in the reservoir 2 has reached the desired maximum point it will be sufficient to move the piston 77 slightly against the tendency of the spring 82, which will cause the lever 85 to rock the controlling-lever 60 and throw the shoulder 63 out of engagement with the spring-pin 66. The arm 25 being now released the spring 45 will throw said arm out of contact with the terminal 27, the pin 66 riding on the rib 62 and springing in the engagement with the shoulder 64. The breaking of the circuit by the movement of the arm 25 will deënergize electromagnet 50, allowing the armature 55 to drop and open the releasing-valve. The effect of this will be the release of the pressure from the cylinder 30 and air-pipe 31, allowing the spring 36 to return the piston 33 to its normal position, carrying with it the contact-segment 22, which will result in throwing into circuit all of the resistances. The return of the contact-segment 22 will stretch the spring 45 again and tend to throw the circuit-closing lever into closed position, but said lever is held against this tendency by the controlling-lever 60 under the action of the compressed air in the air-reservoir. The parts remain in this position until sufficient of the air is used to reduce the pressure in the reservoir to such point that the spring 82 will overbalance it and lower the piston 77 and reverse the position of the controlling-lever 60 and allow the circuit-closing arm 25 to fly back into closed position. The moment the circuit is made the releasing-valve will be closed and the air-compressor again starts up to compress the air to the maximum point. As the compressor starts up it will be observed that the resistance is all in the circuit and the current will be gradually turned onto the compressor. The operation just described is then repeated.

One of the main features of my improved regulator is the automatic interposing of resistance when the trolley has slipped from the line-wire or the main circuit has been otherwise accidentally broken. Immediately upon the breaking of the circuit the releasing-valve will be opened and the pressure from the cylinder 30 exhausted, so that the contact-arm 22 will be returned to normal position, throwing in all of the resistances. As soon as the circuit is made again by replacing the trolley it will be observed that the current will be again gradually turned on as the compressor starts, and all danger of burning out is avoided.

While I have shown and described my improved regulator in connection with an air-brake system for railway-cars, I desire it understood that I do not limit myself to this application, but desire to cover the essential elements of the regulator in any and all systems in which it is desirable to control the action of a motor, and, furthermore, as regards the general principles of my invention that it is not limited to application to air-compressors, but may be applied to various engines operating with fluid-pressure, and is even susceptible, broadly, of application to any mechanisms in which the motor is to be regulated by the condition of pressure or work in the apparatus operated by the motor. By "apparatus operated by the motor" I mean either the main apparatus which performs work or auxiliary apparatus employed merely for regulation of other apparatus.

Having thus described my invention, the following is what I claim as new therein and desire to secure by Letters Patent:

1. The combination of an electric motor, mechanism operated thereby, a variable resistance, a cut-out for the motor and means for operating said cut-out independent of said variable resistance controlled by the condition of pressure or work in said operated mechanism, substantially as set forth.

2. The combination of an electric motor, mechanism operated thereby, a variable resistance, means of cutting out said resistance operated by an increase of pressure or work in said operated mechanism and means operated by the release of said pressure or decrease of work for restoring said resistance to the circuit of said motor, substantially as set forth.

3. The combination of an electric motor, mechanism operated thereby, a variable resistance, a cut-out or switch and means of cutting out said resistance operated by an increase of pressure or work in said operated mechanism.

4. The combination of an electric motor, mechanism operated thereby, a variable resistance, a cut-out or switch and means of cutting out said resistance operated by an increase of pressure or work in said operated mechanism and means operated by the release of said pressure or decrease of work for restoring said resistance to the circuit of said motor, substantially as set forth.

5. The combination of an electric motor, mechanism operated thereby, a variable resistance, means of cutting out said resistance operated by an increase of pressure or work in said operated mechanism, a cut-out for the motor-circuit, means for operating the same at predetermined stages of pressure or work in the mechanism, and means operated by the release of pressure for restoring the said resistance to the circuit, substantially as set forth.

6. The combination of a pump, an electric circuit including an electric motor, a variable resistance, a controlling arm or switch therefor controlled by the fluid-pressure from said pump, a relief-valve for said fluid-pressure and means for releasing said arm and restoring said resistance to circuit controlled by the electric circuit when said pressure is relieved, substantially as set forth.

7. The combination of an electric motor, a fluid-pressure apparatus operated thereby including a reservoir for fluid-pressure, a circuit-controller for said motor controlled by the pressure in said fluid-pressure apparatus, a check-valve for preventing backflow of fluid from the pressure-reservoir, and means for relieving the pressure in said apparatus in rear of said check-valve, substantially as set forth.

8. The combination of an electric motor, a fluid-pressure apparatus operated thereby including a fluid-receiver, a circuit-controller for said motor controlled by the pressure in said fluid-pressure apparatus, a check-valve for preventing the backflow of fluid from the fluid-receiver, and means for relieving the pressure in said apparatus in rear of said check-valve, substantially as set forth.

9. The combination of an electrically-driven fluid-pressure apparatus, a fluid-pressure reservoir communicating with the said apparatus, a check-valve between the reservoir and fluid-pressure apparatus, means operated by the fluid-pressure in the apparatus for making and breaking the electric circuit, and means controlled by the fluid-pressure in the reservoir for locking and releasing the circuit making and breaking device, as set forth.

10. In an automatic regulator for air-compressors, the combination of an electrically-driven air-compressor, an electric circuit including the air-compressor, an air-reservoir communicating with the compressor, a check-valve between the reservoir and compressor, means operated by the pressure of the air in the compressor for making and breaking the electric circuit, and means controlled by the pressure of the air in the reservoir for locking and releasing the circuit making and breaking device, as set forth.

11. The combination of an electric motor, a fluid-pressure pump operated thereby, a fluid-pressure reservoir supplied by said pump, a variable resistance, a cut-out for the motor, mechanism operated by increase of pressure in the pump, for throwing said resistance out of the motor-circuit, means controlled by the pressure in the reservoir for cutting out said motor, means operated by the fall of pressure in the fluid-supply pipes, for restoring said resistance to the circuit and means operated by the fall of pressure in the reservoir for cutting in the motor all arranged and adapted to operate, substantially as set forth.

12. The combination of an electric motor, a fluid-pressure pump operated thereby, a fluid-pressure reservoir, a cut-out for said motor, means operated by the fall of pressure in said reservoir for operating said "cut-out" to cut in said motor, means of locking the cut-out when so operated, and means for unlocking said cut-out and cutting out said motor operated by a predetermined rise of pressure in said reservoir, substantially as set forth.

13. The combination of an electric motor, a fluid-pressure pump operated thereby, a fluid-pressure reservoir connected therewith, a variable resistance, a controlling device operated by rise of pressure in the fluid-pressure apparatus to remove said resistance from the motor-circuit and means, controlled by the fall or release of said pressure to restore said resistance to the circuit, substantially as set forth.

14. The combination of an electric motor, fluid-pressure apparatus comprising a fluid-pressure pump operated by said motor and a fluid-pressure reservoir connected to said pump, a variable resistance, means operated by increase of pressure in said apparatus for removing said resistance from the motor-circuit, a pressure-relief device controlled by current in the motor-circuit, and means for